(12) United States Patent
Girelli Consolaro et al.

(10) Patent No.: US 9,849,744 B2
(45) Date of Patent: Dec. 26, 2017

(54) LEAF SPRING BEARING AND VEHICLE WHEEL SUSPENSION CONTAINING SAME

(71) Applicant: FORD GLOBAL TECHNOLOGIES, LLC, Dearborn, MI (US)

(72) Inventors: Alberto Girelli Consolaro, Aachen (DE); Marc Simon, Köln (DE); Paul Zandbergen, Montzen (BE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 108 days.

(21) Appl. No.: 14/470,930

(22) Filed: Aug. 27, 2014

(65) Prior Publication Data

US 2015/0061255 A1 Mar. 5, 2015

(30) Foreign Application Priority Data

Aug. 28, 2013 (DE) ........................ 10 2013 217 113

(51) Int. Cl.
*B60G 11/107* (2006.01)
*B60G 11/08* (2006.01)

(52) U.S. Cl.
CPC ............ *B60G 11/107* (2013.01); *B60G 11/08* (2013.01); *B60G 2202/114* (2013.01); *B60G 2204/121* (2013.01)

(58) Field of Classification Search
CPC ............................. B60G 11/107; B60G 11/08; B60G 2204/121; B60G 2202/114; F16F 1/26;

(Continued)

(56) References Cited

U.S. PATENT DOCUMENTS 3,575,403 A * 4/1971 Hamel ................... B61F 5/305
                                                    105/198.7
3,920,231 A * 11/1975 Harrison ................ F16F 13/08
                                                    105/224.1

(Continued)

FOREIGN PATENT DOCUMENTS

DE    10 2010 060 093 A1    4/2012

OTHER PUBLICATIONS

German Examination Report issued May 14, 2014 in related German Patent Application No. 10 2013 217 113.7.

(Continued)

*Primary Examiner* — Darlene P Condra
(74) *Attorney, Agent, or Firm* — Jones Robb, PLLC; Raymond L. Coppiellie

(57) ABSTRACT

A leaf spring bearing for a vehicle with a transverse leaf spring. The leaf spring bearing includes an upper bearing block and a lower bearing block between which a portion of the transverse leaf spring can be interposed. Each bearing block is formed at least partially of elastic material and comprises an upper support surface and a lower support surface. At least one of the upper and lower bearing blocks has a bearing core and an insert positioned in the elastic material between the upper and lower support surfaces so as to define three layers of the elastic material within the at least one bearing block. At least one of the upper and lower bearing blocks has two support plates arranged either outside the elastic material or at least partially surrounded by the elastic material in the area of the upper and lower support surfaces of the bearing block.

21 Claims, 7 Drawing Sheets

(58) Field of Classification Search
CPC ...... F16F 1/30; F16F 1/371; F16F 1/40; F16F 9/306
USPC .... 267/2, 36.1, 292, 294, 140.3, 140.4, 141, 267/140.11, 140.13
See application file for complete search history.

(56) References Cited

U.S. PATENT DOCUMENTS

| | | | | |
|---|---|---|---|---|
| 4,623,133 | A * | 11/1986 | Davis et al. | 267/53 |
| 4,744,539 | A * | 5/1988 | Stimeling | F16F 1/40 |
| | | | | 248/632 |
| 4,899,323 | A * | 2/1990 | Fukahori et al. | 367/176 |
| 5,641,153 | A * | 6/1997 | Gwinn | B60G 13/02 |
| | | | | 267/140.13 |
| 5,676,356 | A * | 10/1997 | Ekonen | B60G 5/053 |
| | | | | 248/634 |
| 5,868,384 | A * | 2/1999 | Anderson | 267/141.1 |
| 6,178,894 | B1 * | 1/2001 | Leingang | 105/224.1 |
| 6,189,904 | B1 * | 2/2001 | Gentry et al. | 280/124.175 |
| 6,206,407 | B1 * | 3/2001 | Fuchs | B60G 5/00 |
| | | | | 280/124.174 |
| 7,017,888 | B2 * | 3/2006 | Platner et al. | 267/36.1 |
| 7,201,367 | B2 * | 4/2007 | Wietharn | B60G 11/22 |
| | | | | 267/141 |
| D624,463 | S * | 9/2010 | Noble et al. | D12/159 |
| 8,070,143 | B2 * | 12/2011 | Wietharn | B60G 11/22 |
| | | | | 248/632 |
| 2003/0164586 | A1 * | 9/2003 | Michael | F16F 1/406 |
| | | | | 267/140.11 |
| 2012/0098229 | A1 * | 4/2012 | Hochapfel et al. | 280/124.134 |
| 2012/0146308 | A1 * | 6/2012 | Fruhmann et al. | 280/124.175 |
| 2012/0146310 | A1 * | 6/2012 | Fruhmann | B60G 11/08 |
| | | | | 280/124.175 |
| 2012/0153594 | A1 * | 6/2012 | Heimann et al. | 280/124.175 |
| 2012/0292840 | A1 * | 11/2012 | Mitsch | F03D 11/00 |
| | | | | 267/141 |
| 2013/0009377 | A1 * | 1/2013 | Noble et al. | 280/124.178 |
| 2014/0327196 | A1 * | 11/2014 | Hummelt | B60G 11/08 |
| | | | | 267/52 |

OTHER PUBLICATIONS

Chinese Notification of First Office Action in Application No. 201410432878.2, dated Aug. 2, 2017.

* cited by examiner

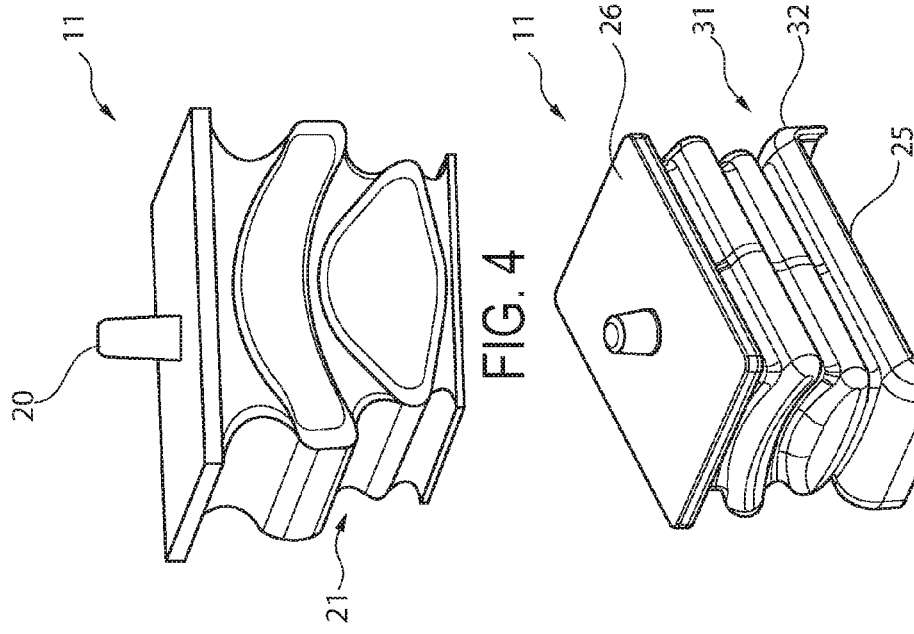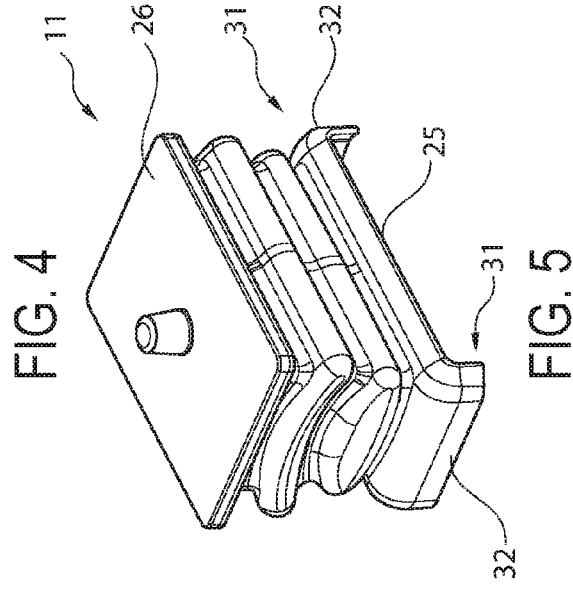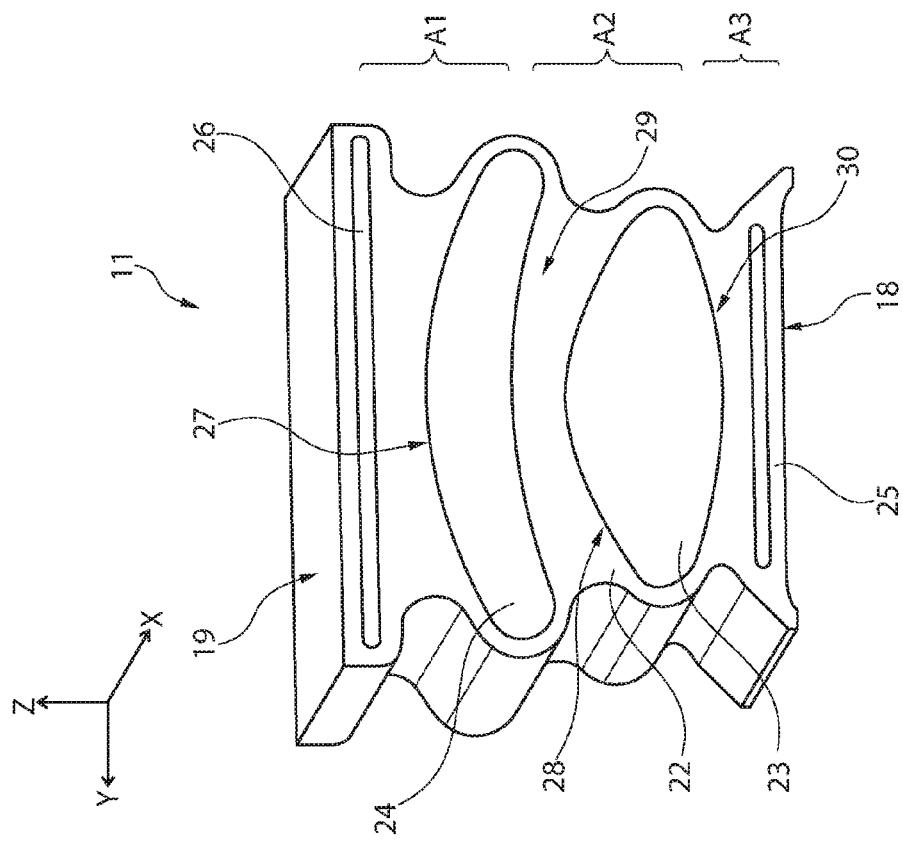

LEAF SPRING BEARING AND VEHICLE WHEEL SUSPENSION CONTAINING SAME

CROSS REFERENCE TO RELATED APPLICATIONS

This application claims priority to German Application No. 10 2013 217 113.7, filed on Aug. 28, 2013, the entire content of which is incorporated by reference herein.

TECHNICAL FIELD

The present disclosure relates to a wheel suspension for a motor vehicle with a transverse leaf spring which is arranged transversely to the vehicle and which is connected to the motor vehicle body via at least one transverse leaf spring bearing.

BACKGROUND

As part of a vehicle suspension system, vehicle wheel suspensions serve to connect the wheels to the vehicle. The vehicle wheel suspension can be connected directly to the normally self-supporting bodywork. Depending on configuration, the vehicle wheel suspension also can be arranged on a subframe connected to the bodywork or on a vehicle chassis.

DE 10 2010 060 093 A1 discloses a vehicle wheel suspension for a vehicle with a transverse leaf spring. The transverse leaf spring is connected to the vehicle via two spaced leaf spring bearings. The disclosed bearings permit only a slight, even, relative movement of the opposing outer support surfaces of the bearing block in relation to each other. In combination with the transverse leaf spring, this limits the mobility of the leaf spring to a few degrees of freedom.

In this context, an object of the present disclosure is to create a vehicle wheel suspension with a transverse leaf spring arranged transversely to the vehicle longitudinal axis, and a leaf spring bearing that overcomes or obviates at least one of the above-described limitations.

SUMMARY

In accordance with various exemplary embodiments, the present disclosure provides a leaf spring bearing for a vehicle with a transverse leaf spring. The leaf spring bearing comprises an upper bearing block and a lower bearing block. Each bearing block is formed at least partially of elastic material and comprises an upper support surface and a lower support surface between which a portion of the transverse leaf spring can be interposed. At least one of the upper and lower bearing blocks has a bearing core and an insert positioned in the elastic material between the upper and lower support surfaces so as to define three layers of the elastic material within the at least one bearing block. At least one of the upper and lower bearing blocks has two support plates arranged either outside the elastic material or at least partially surrounded by the elastic material in the area of the upper and lower support surfaces of the bearing block. The support plates have closing contours arranged at their respective end regions which can be brought at least partially into engagement with each other to couple the two bearing blocks.

In accordance with another aspect of the present disclosure, a vehicle wheel suspension is provided. The vehicle wheel suspension comprises a transverse leaf spring and a leaf spring bearing. The leaf spring bearing comprises two bearing blocks of elastic material between which the transverse leaf spring is positioned. The leaf spring bearing couples the transverse leaf spring to a vehicle. At least one of the bearing blocks has a bearing core and an insert positioned in the elastic material between an upper support surface and a lower support surface of the block so as to define three layers of the elastic material within the at least one bearing block. At least one form-fit element is provided which is arranged in a contact region between the transverse leaf spring and a support surface of at least one of the two bearing blocks with which the transverse leaf spring is at least partially in contact.

In accordance with another aspect of the present disclosure, a leaf spring bearing for a vehicle with a transverse leaf spring comprises an upper bearing block and a lower bearing block. Each bearing block is formed at least partially of an elastic material and comprises an upper support surface and a lower support surface between which a portion of the transverse leaf spring can be interposed. The bearing has a stiffness in the vertical direction, a torsional stiffness, and a transverse stiffness, wherein the stiffness in the vertical direction is greater than the torsional stiffness and greater than the transverse stiffness. At least one of the upper and lower bearing blocks comprises three layers of the elastic material, wherein the layers of the elastic material are at least partially separated from one another by a material having a hardness greater than the hardness of the elastic material.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 3 is a perspective cross-sectional view of a first exemplary embodiment of first bearing block of the leaf spring bearing from FIG. 2;

FIG. 4 is a perspective view of an alternative exemplary embodiment of the first bearing block of the leaf spring bearing from FIG. 2;

FIG. 5 is a perspective view of another alternative exemplary embodiment of the first bearing block of the leaf spring bearing from FIG. 2;

Figure 1:
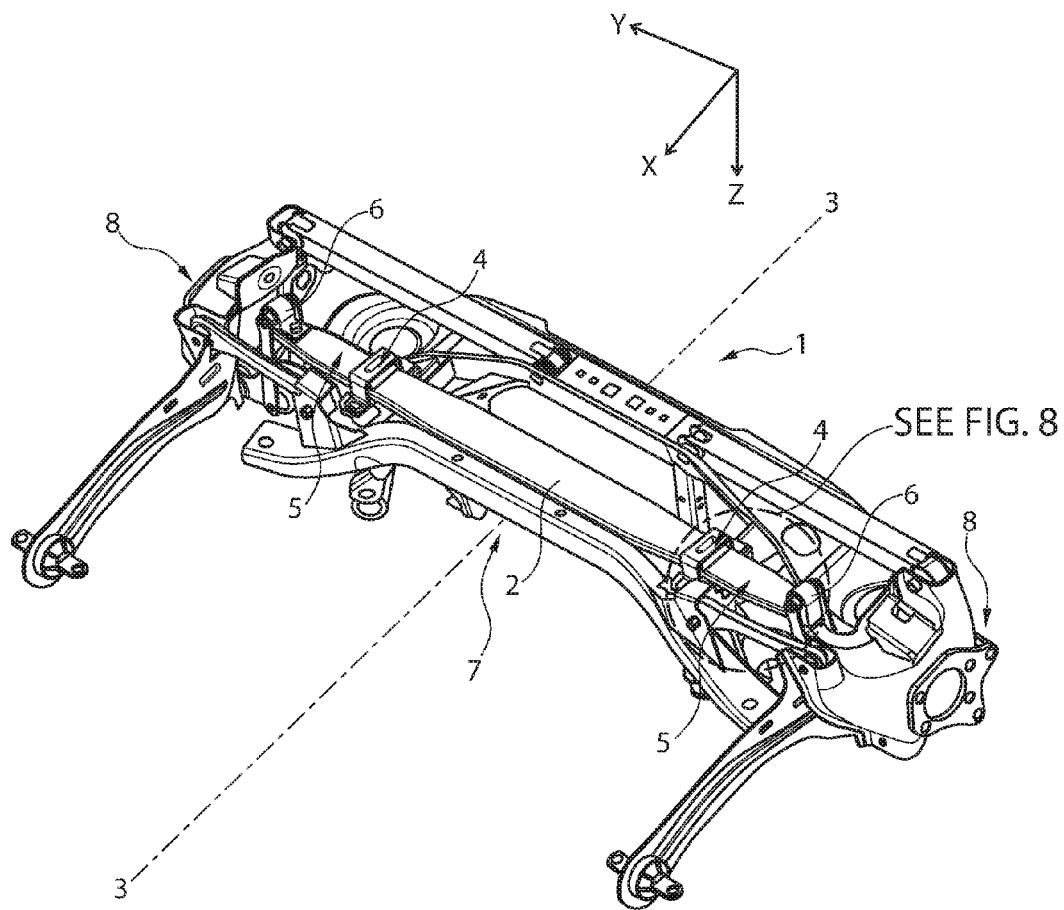
FIG. 1 is a perspective view from below of an exemplary embodiment of a vehicle wheel suspension with a transverse leaf spring according to the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

The present disclosure provides a leaf spring bearing that provides simple installation and a high positional accuracy in the installed state, a high stiffness in the vertical direction, and a low torsional and transverse stiffness parallel to and about the longitudinal direction of a transverse leaf spring of a vehicle wheel suspension. In accordance with the present teachings, the novel leaf spring also has a low stiffness in its longitudinal direction transversely to the longitudinal direction of the transverse leaf spring.

Solutions which are as light and compact as possible, in particular for rear vehicle wheel suspensions, provide the use of a leaf spring. A transverse leaf spring is fitted transversely to the direction of vehicle travel and mounted on the vehicle and connected thereto via leaf spring bearings. In this way, the transverse leaf spring can replace the suspension springs and anti-roll bar which would otherwise be necessary. In order to assume the functions of the suspension springs and anti-roll bar, the transverse leaf spring must simultaneously guarantee a degree of roll stiffness (resistance to opposing vertical movements of the wheels) and a degree of lift stiffness (resistance to vertical movements of the wheels in the same direction). Typically these stiffnesses are different.

In order to provide the stiffnesses, the transverse leaf spring is connected to the sprung mass of the vehicle via two leaf spring bearings arranged at a specific distance from each other. The free end portions of the transverse leaf spring extending beyond the leaf spring bearing can therefore be deflected in a sprung manner. Their outer ends are connected to the movably pivoted parts of the vehicle wheel suspensions and thus to the unsprung masses of the vehicle. This establishes a four-point flexion system.

The leaf spring bearings fulfill complex, simultaneously different requirements. Thus, in relation to the typical orientation of the vehicle and the installation position of the transverse leaf spring, a high stiffness in the vertical direction of the leaf spring bearings is desirable. This is because the vertical compliance of the leaf spring bearing influences the resulting roll and lift stiffness. In particular, a lower vertical stiffness leads to a lower ratio between roll and lift stiffness, which is undesirable. A high ratio between roll and lift stiffness guarantees that the vehicle wheel suspension offers a high resistance to roll movements of the vehicle superstructure. At the same time, this ensures adequate compliance in the vertical movement direction for good driving comfort.

Furthermore, a low stiffness of the inner pivot points of the leaf spring bearings towards each other (laterally) in the longitudinal direction of the transverse leaf spring is desirable. This allows a deformation of the middle segment of the transverse leaf spring between the leaf spring bearings during the lift and roll movements of the vehicle. Such deformations of the transverse leaf spring are dependent on a change in the lateral distance between the inner pivot points.

In addition, a low torsional stiffness of the leaf spring bearings about their longitudinal direction is desirable. The reason for this is firstly the above-mentioned desirable deformability of the transverse leaf spring in its middle portion. Secondly, this prevents the bearing stiffness of the leaf spring bearings from making a great contribution to the total roll and lift stiffness of the transverse leaf spring (parasitic contribution).

In order to avoid deterioration in the dynamic vehicle behavior, the leaf spring bearings as a whole are designed with a low friction and a low hysteresis. Further objectives in the design of leaf spring bearings moreover comprise, amongst others, low cost and low weight, protection from dirt, resistance to high temperatures, moisture and chemical substances etc., and observation of construction space constraints.

With these objectives in mind, and in accordance with the present teachings, a leaf spring bearing for a vehicle with a transverse leaf spring comprises two bearing blocks of an elastic material, between which a portion of the transverse leaf spring can be interposed. Each of the bearing blocks includes an upper support surface and a lower support surface.

At least one of the bearing blocks has a bearing core arranged between two of its support surfaces in the elastic material, the bearing core being harder than the elastic material. The present disclosure provides that, in addition to the bearing core, an insert may be present in the bearing block, the insert being formed of a material harder than the elastic material. The arrangement of the bearing core and insert are such that they define the formation of three elastic layers in the elastic material of the bearing block. The insert and the bearing core are spaced both from each other and also from the support surfaces. In other words, the insert and the bearing core are arranged relative to each other, between the opposing support surfaces of the corresponding bearing block, such that a layer of the elastic material in the form of an elastic layer remains between the insert or core and the support surfaces and between the insert and the bearing core. The respective thicknesses of these elastic layers are adapted to the respective requirements for the leaf spring bearing in relation to its different stiffnesses.

To this extent, the bearing blocks are elastic moldings of the elastic material within which the bearing core and insert are arranged.

At least one of the two bearing blocks has at least one, preferably two support plates which are harder than the elastic material. These are arranged in the region of the two opposing support surfaces of the bearing block. The support plates can be arranged outside the elastic material. The support plates can at least partially cover the respective support region of the bearing block, and may extend over the full area of the support surface. In an alternative embodiment, at least one of the support plates can be at least partially surrounded by the elastic material. In principle, the support plate can also be arranged inside the elastic material.

Suitable materials for the insert and/or the bearing core and/or at least one of the support plates are all materials which have a hardness greater than the elastic material. Thus, the elastic material and the insert and/or the bearing core and/or the support plate can comprise substantially the same material, wherein its properties are set harder or softer accordingly. Exemplary materials for the insert and/or bearing core and/or support plates include aluminum, steel, and hard plastic. Combinations of these materials are also conceivable. Aluminum and hard plastic have a corresponding weight advantage in comparison with the use of steel.

At least one of the support plates, and in some exemplary embodiments, both support plates, have closing contours arranged at their respective end regions. In an exemplary embodiment of the present disclosure, the closing contours are arranged on end regions of the support plates which face each other in the installation position of the transverse leaf spring. The closing contour are configured to couple the two support blocks to one another, for which the closing contours can be bought at least partially into engagement with each other. The closing contours can be configured such that these allow, for example, for a single-use, for permanent engagement, or for easy separability of the engagement. The closing contours can, for example, be complementary hook elements which engage each other in regions via corresponding undercuts. The closing contours can be configured such that they simultaneously fulfill the function of support elements, as stated above.

In each case, a form fit which can be achieved at least in certain regions is proposed in order to connect together the two bearing blocks which lie directly opposite each other on one portion of the transverse leaf spring.

The main advantage resulting from this lies in the three elastic layers of the elastic material, with sufficient thickness of their respective cross-sections. In total this gives a specific proportion of elastic material between the two support surfaces of the corresponding bearing block. This gives an overall greater movability of the leaf spring within the leaf spring bearing. The arrangement of three elastic layers achieves an improved multidirectional articulation in comparison with the known transverse leaf spring bearings. In combination with the bearing core which is harder than the elastic material, and the insert, a sufficiently high stiffness in the vertical direction is achieved. The reason for this is the still large cross-section of the leaf spring bearing with a correspondingly high surface area proportion which would have to be compressed for a possible vertical movement.

Furthermore, the movability of the leaf spring bearing in its transverse direction and, thus, parallel to the longitudinal direction of the transverse leaf spring, is also ensured by a low stiffness. In particular, its stiffness is reduced in the longitudinal direction of the leaf spring bearing, perpendicular to the longitudinal direction of the transverse leaf spring. This gives the transverse leaf spring a greater freedom of movement in this direction. The reduced stiffness and, thus, greater movability in this direction is due to the high proportion of elastic material as the sum of the three elastic layers. The additional use of the insert creates a combination, retaining all advantages, of an elastic material and a material harder than this. The now enlarged cross-section region of the elastic material allows an additional or at least a greater movability in relation to transverse (shear) stresses. This is in particular attributable to the reduced stiffness in the longitudinal direction of the leaf spring bearing and hence transversely to the longitudinal direction of the transverse leaf spring.

The bearing blocks are consequently provided to create a contact, at least in regions, with at least two of their opposing outer support surfaces, between the transverse leaf spring and the vehicle. For this, in the proposed installation position, the respective support surfaces of the two bearing blocks enclose between them a portion of the transverse leaf spring. One of the two support surfaces of the two bearing blocks, opposite the support surface in contact with the transverse leaf spring, may have a contact to the bodywork, a subframe or a vehicle chassis of the vehicle in the installation position. The respective other of these support surfaces may be in contact with a retention device, wherein the leaf spring bearing with the transverse leaf spring is arranged between the retention device and the bodywork, subframe or chassis of the vehicle.

The advantage resulting from the arrangement of at least one support plate lies in the resulting simple provision of a preferably flat surface for connection of the bearing block. Insofar as the support plate itself has a high stiffness, this can also serve for an improved load transfer—preferably over full surface area—to the bearing block. This also evidently applies to the transfer of loads via the bearing block. The advantage resulting from integration of the support plate in the elastic material, or by correspondingly surrounding this with the elastic material, lies for example in an improved protection from corrosion.

The arrangement of at least one closing contour advantageously allows a precise arrangement of the two bearing blocks together on the transverse leaf spring before this is fixed in its installation position. This virtually excludes any positional defects in assembly. It also facilitates the integration of the transverse leaf spring, since this now forms a unit together with the two bearing blocks of the respective leaf spring bearing, allowing significantly easier handling. In comparison, otherwise it would be necessary to handle at least three separate components per leaf spring bearing.

According to an exemplary embodiment of the present disclosure, the insert can have a convex outer surface region facing away from the bearing core. A first elastic layer of the three elastic layers extends between this convex outer surface region of the insert and one of the support surfaces which faces away from the leaf spring bearing in its installation position.

The convex design advantageously thickens the regions of the elastic material in their cross-section towards the free side faces of the bearing block. This gives a greater compressibility which in particular leads to a low torsional stiffness of the leaf spring bearing. At the same time, the part of the convex outer surface region close to the one support region is responsible for the diminution in the proportion of elastic material, so that a high stiffness in the vertical direction remains guaranteed.

A preferred refinement of the novel concept provides that the bearing core may have a convex inner surface region facing the insert. Opposite this, the insert may have a concave inner face region facing the bearing core. Thus the concave inner surface region of the insert and the convex inner surface region of the bearing core correspond to each other. In this exemplary embodiment, a second elastic layer of the three elastic layers can extend between the convex inner surface region of the bearing core and the opposing concave inner surface of the insert.

This advantageously gives as even as possible a behavior of the second elastic layer running between the insert and the bearing core. The second elastic layer, in relation to its thickness extending between the insert and the bearing core, may have an even or an uneven development. The second elastic layer has a concave lenticular form in its respective cross-section, such that the inner face of the insert and the bearing core lie convex/concave opposite each other. In this way the second elastic layer thickens towards the free side faces of the bearing block, while its middle region has a smaller thickness. This achieves in particular a low torsional stiffness of the leaf spring bearing, wherein the insert is twisted about the bearing core and the thickened regions of the second elastic layer are compressed.

In a further exemplary embodiment, the bearing core may have a convex outer surface region facing away from the insert. Here a third elastic layer of the three elastic layers can extend between this convex outer surface region of the bearing core and one of the support surfaces which faces the transverse leaf spring in the installation position of the leaf spring bearing. In this way the advantages of such an embodiment, as already described for the first and second elastic layer, are also achieved in relation to the third elastic layer. This therefore also has a proportion of elastic material which increases towards the free side faces of the bearing block, while its middle region has a comparatively smaller proportion. This further improves the required low torsional stiffness of the transverse leaf spring bearing.

It is provided that both the insert and the bearing core are either fully integrated within the elastic material or are connected to the elastic material only in regions, in particular in the regions of the elastic layers. A complete embedding of the insert and the bearing core in the elastic material has the advantage that this can for example be well protected from corrosion.

Furthermore the support plate can also have a form-fit element which for example cooperates with a corresponding geometry of the transverse leaf spring or a bearing region of the vehicle. Insofar as the leaf spring bearing is for example connected to the vehicle via an additional retention device, this may also have a geometry corresponding to the form-fit element. The form-fit element can, for example, be a protrusion or a peg-like element which in the installation position engages, at least in some regions, in a corresponding recess or opening of the corresponding geometry.

At least one of the support plates may have support elements arranged at its end regions. The support elements can, for example, take the form of angled legs. Alternatively, elements can be placed on or in the support plate and, for example, are connected to the support plate via connecting means or by material connection. Additionally or alternatively, a pure form fit is conceivable insofar as the elements are inserted in the end regions of the support plate. In any case, the support elements are configured to at least partially surround a periphery of the transverse leaf spring, or to rest at least on an edge region of the transverse leaf spring.

The edges of the transverse leaf spring are its long sides which limit the respective width of the transverse leaf spring.

It is proposed that the support plate together with the end support elements can have a C-shape configuration in its in longitudinal section.

The advantage resulting from the arrangement of a support element and/or a form-fit element lies in the reliable, easily achievable positioning of the bearing block fitted with such a support plate on the transverse leaf spring. This can effectively prevent in advance any positioning errors in assembly. This is because both the support elements and the form-fit elements align the bearing block precisely in its orientation transversely to the longitudinal direction of the transverse leaf spring. In addition this also achieves a permanently precise positioning of the bearing block which is retained even after an extended period of use. In addition to the alignment function, the support elements and the form-fit elements also have a retention function in at least one direction.

To achieve as universal an application as possible for such a support plate for transverse leaf springs of different configuration, additional intermediate pieces may be provided. The intermediate piece(s) may be a separate element which is arranged in any gap between at least one edge of the transverse leaf spring and a surface of the support element directly opposite this. In other words, such an intermediate piece can compensate for any tolerance in the support plate thus configured in relation to the respective width of the transverse leaf spring.

In this way a single embodiment of the support plate can be used to accommodate the different widths and/or thicknesses of transverse leaf springs. Because of the high production quantities, this can advantageously lead to a clear reduction in production costs. The actual adaptation to the respective transverse leaf spring then takes place via such an intermediate piece which at least in regions fills the remaining contact-free gap or space between the support plate thus configured and the transverse leaf spring. Such a gap or space can exist between an edge and a support plate and/or between a region of a side of the transverse leaf spring and such a support plate.

To this extent, a corresponding intermediate piece can be arranged between an edge region of the transverse leaf spring and a support element of the support plate, and/or a side region of the transverse leaf spring and the support plate forming the corresponding support surface of the bearing block.

Depending on requirement, such an intermediate piece can be inserted in the existing gap or space, loosely or with force fit. A tension necessary for the force fit can be achieved in that the intermediate piece is inserted in the gap or space by application of a corresponding force. The pretension generated thus via the intermediate piece, between at least one support element and an edge region of the transverse leaf spring, advantageously leads to a precise positioning of the bearing block thus configured in relation to the transverse leaf spring. Also the intermediate pieces can serve to fix said bearing block on the transverse leaf spring via the resulting pretension, which allows simpler installation on the vehicle.

Such an intermediate piece can be made of an elastic material such as, for example, rubber. Additionally or alternatively, a harder material can be used such as, for example, aluminum, steel, or hard plastic. In principle the intermediate piece may also be surrounded or partially surrounded by an elastic material or covered with this material over the whole surface. This can achieve a corrosion protection and an advantageous tension on insertion of the intermediate piece. The intermediate piece can also be adapted in form to the respective cross section geometry of the support plate and/or the transverse leaf spring.

The present disclosure provides a highly advantageous leaf spring bearing which has a high stiffness in the vertical direction, a low torsional and transverse stiffness parallel to and about the longitudinal direction of the transverse leaf spring, and also a low stiffness in its longitudinal direction transversely to the longitudinal direction of the transverse leaf spring. This is attributable to the formation of the three elastic layers by the use of the bearing core and an additional insert. This advantageously allows a multiple articulation of the leaf spring bearing and enlarges the relevant cross-sections for the required stiffnesses.

In particular the arrangement of the support plates and the support elements additionally provided thereon and/or the closing contours ensures a very simple mounting of the structure which would otherwise be difficult to install. Furthermore it reduces to a minimum the risk of any error in the positioning of the bearing blocks in relation to the transverse leaf spring, both during assembly and permanently.

In addition, the present disclosure provides a vehicle wheel suspension with a transverse leaf spring and such a leaf spring bearing. As indicated above, the leaf spring bearing comprises two bearing blocks of an elastic material incorporating the transverse leaf spring between them and coupling it to a vehicle. At least one of the bearing blocks has a bearing core arranged between two of its support surfaces, at least partly in the elastic material and comprising a material harder than the elastic material. According to the present disclosure, an additional insert is provided, which comprises a material harder than the elastic material, wherein with formation of three elastic layers of the elastic material, the insert and bearing core are spaced both from each other and from the support surfaces.

Furthermore at least one form-fit element is provided. The at least one form-fit element is arranged in a contact region between the transverse leaf spring and one of the support surfaces of at least one of the two bearing blocks. In a particularly preferred manner, this is the support surface of the bearing block with which the transverse leaf spring is in contact at least in regions. Evidently also it is conceivable for the form-fit elements to be arranged in the entire contact region between the transverse leaf spring and the bearing blocks, and between the bearing blocks and a bearing region of the vehicle. Insofar as a retention device is provided, a corresponding form-fit element can also be arranged between this and the corresponding bearing block in its contact region. The use of at least one form-fit element allows a precise and simple installation, in order to reduce any positioning errors to a minimum.

The resulting benefits are attributable in particular to the use of the leaf spring bearing according to the present disclosure, which has been explained above in detail with the resulting advantages.

The vehicle wheel suspension may be one which is used in the form of a rear wheel suspension.

The form-fit element is configured to prevent a relative movement of the bearing block, parallel to the support surface, in relation to the transverse leaf spring and/or the opposing contact regions of the retention device and/or the vehicle. In a particularly preferred embodiment, form-fit elements are provided on both opposing support surfaces, between which the leaf spring is incorporated in regions. In this way any transverse movement of the inner connections, thus created, of the leaf spring bearing can be effectively suppressed. As a whole, this gives a simple and permanent positioning of at least one bearing block.

The transverse leaf spring can be provided with corresponding form-fit elements on both its side faces facing the bearing blocks. These can be, for example, ribs against which the respective support surface of the bearing blocks is pressed or placed in mounted state. Insofar as the support surfaces have regions with the elastic material, the ribs can be pressed into these to generate a form fit. In this way a strong retention effect is created, parallel to the plane of the contact region between the bearing block and the transverse leaf spring.

The support surface of the bearing block can itself also comprise form-fit elements. When support plates are used, the form-fit elements can also be arranged directly thereon. In this context it is conceivable that the transverse leaf spring itself comprises, in a similar manner, a layer of an elastic material in the contact region. Alternatively the form-fit elements can also be arranged both on the transverse leaf spring and on at least one support surface of a bearing block, and correspond to each other.

The terms "support surface" and "support plate" in the sense of the present disclosure are synonymous insofar as at least one support surface of the bearing block can evidently also be formed by the support plate.

The respective dimensions, cross-section and material used for such a form-fit element are established taking into account the respective function and the production method used. Thus the form-fit element can be made, for example, of a resin which is applied in regions with corresponding contouring and hardened. The form-fit element can take various forms such as, for example, an oblong form or a droplet form. The respective cross-section of a form-fit element can be, for example, dome-shaped.

As a whole, the form-fit element can be designed as a rib, bulge, cavity or opening. Consequently, this can be formed by an additional element, a suitable shape or an additional material, but also for example by material removal. Depending on configuration, the form-fit element is designed so that it corresponds for example to another form-fit element.

In relation to the cross-section dimensioning of the form-fit element, this can for example have a width and/or a height of 1.0 mm in order to obtain a sufficient retention effect in the plane of the contact region.

Advantageously, the vehicle wheel suspension can have a retention device. The retention device serves to connect the bearing blocks to the vehicle, between which the transverse leaf spring is mounted in sections, in the form of a pivoting clamp. This also establishes the position of the bearing blocks in relation to the transverse leaf spring. The retention device is preferably configured so that it surrounds, at least in regions, at least one of the bearing blocks and the transverse leaf spring incorporated between these. In this way the transverse leaf spring and the bearing blocks together can be coupled to the bodywork, a subframe or a chassis of the vehicle via this retention device.

The retention device creates an effective and easily accessible possibility for coupling the leaf spring bearing together with the transverse leaf spring to the vehicle.

The retention device can be produced in the form of a bracket. It may have a web with legs arranged on both sides which are directed towards the side. At the ends of the legs, fixing elements can be arranged via which the retention device can be coupled to the vehicle. Advantageously the retention device is designed as an integral bent body of uniform material, wherein the leg angled to one side in relation to the web and the fixing elements angled at the end of the leg take the form of flanges. The fixing elements and/or the fixing flanges preferably extend away from each other in opposing directions. This allows as clear a space as possible between the web and the two legs, for receiving the bearing blocks together with the transverse leaf spring.

In one exemplary embodiment, one of the bearing blocks rests via one of its support surfaces on the web of the retention device while the opposing support surface is in contact with the transverse leaf spring. In this arrangement the transverse leaf spring runs through the leaf spring bearing at the height of a middle region of the retention device. The middle region relates to the vertical direction in which the legs of the retention device extend. The bearing block which, in relation to the transverse leaf spring, lies opposite the bearing block arranged in this way, then has contact via one of its support surfaces with the transverse leaf spring, wherein said bearing block can rest for example against a bearing region of the vehicle via its other support surface.

The bearing block supported via one of its support surfaces on the web of the retention device may have, in this region, a support plate with end support elements. The support elements may be configured and oriented so that they surround the web of the retention device peripherally or at least rest on this. This allows a permanent positioning of the bearing block in relation to the retention device in at least one direction.

Advantageously, the fixing elements are configured such that they allow a change in distance between the web of the retention device and the bearing region of the vehicle. Alternatively, the fixing elements and/or fixing flanges can be combined with corresponding connecting means, via which the distance between the web of the retention device and the bearing region of the vehicle can be manipulated. The latter solution has the advantage that the connecting means, as well as ensuring the adjustability of the distance, at the same time allow the retention device to be coupled to the vehicle.

With a corresponding reduction in the distance, a pretension can be applied to the two bearing blocks and adapted to the respective requirements. The pretension which can be generated in this way can be increased for example to prevent any slip between these and the transverse leaf spring. It must be ensured that the pretension is not selected too high, since this could otherwise lead to excessive friction between the bearing blocks. To reduce this to the necessary value, the pretension can be reduced again accordingly by changing the distance.

The fixing elements or connecting means used to manipulate the distance can have a suitable pitch, for example in the form of a helicoidal thread. In this way, the desired distance and hence the necessary pretension within the leaf spring bearing can be achieved by rotation of the thread about its longitudinal axis. Such connecting means can be, for example, screw bolts with which the retention device can be fixed to the vehicle.

Turning now to the drawings, FIG. 1 is a perspective view from below of a first exemplary embodiment of a vehicle wheel suspension 1 according to the present teachings. Vehicle wheel suspension 1 includes a transverse leaf spring 2 for an axle of a vehicle (not shown in more detail), in particular a motor vehicle. The transverse leaf spring 2 is arranged, in relation to its longitudinal direction, transversely to a vehicle longitudinal axis 3. In the installation position of the transverse leaf spring 2 shown here, this is mounted primarily via two leaf spring bearings 4 spaced from each other in the longitudinal direction of the transverse leaf spring 2.

The transverse leaf spring 2 has free end portions 5 protruding beyond the leaf spring bearings 4. At their outer ends, both end portions 5 are connected via articulated connections 6 to further moveably pivoted parts of the vehicle wheel suspension 1 and hence to the unsprung mass of the vehicle. The leaf spring bearings 4 thus provide inner pivot points for the transverse leaf spring, while the outer articulated connections 6 act as outer pivot points. In the present case, the leaf spring bearings 4 are connected to a subframe 7 of the vehicle. Thus the transverse leaf spring 2 is supported and held on the subframe 7 via the two leaf spring bearings 4. The outer pivot points of the transverse leaf spring 2 are each connected to a wheel carrier 8 via the articulated connections 6.

What is not evident from FIG. 1, and will be explained in more detail below, is that the transverse leaf spring 2 rests in the inner pivot points of the leaf spring bearings 4 via at least one molding of an elastic material, for example a rubber body. To retain a definitive orientation of the leaf spring bearing 4 or its components in relation to the vehicle, the terms longitudinal direction x, transverse direction y and vertical direction z are used below, as marked in FIG. 1. The longitudinal direction x of the leaf spring bearing 4 runs parallel to the vehicle longitudinal axis 3. In comparison, the transverse direction y of the leaf spring bearing 4 runs perpendicular to the vehicle longitudinal axis 3 and thus parallel to the longitudinal axis of the transverse leaf spring 2. Finally, the vertical direction z runs in a height direction of the vehicle, which therefore normally stands perpendicular to the longitudinal direction x and the transverse direction y.

Figure 2:
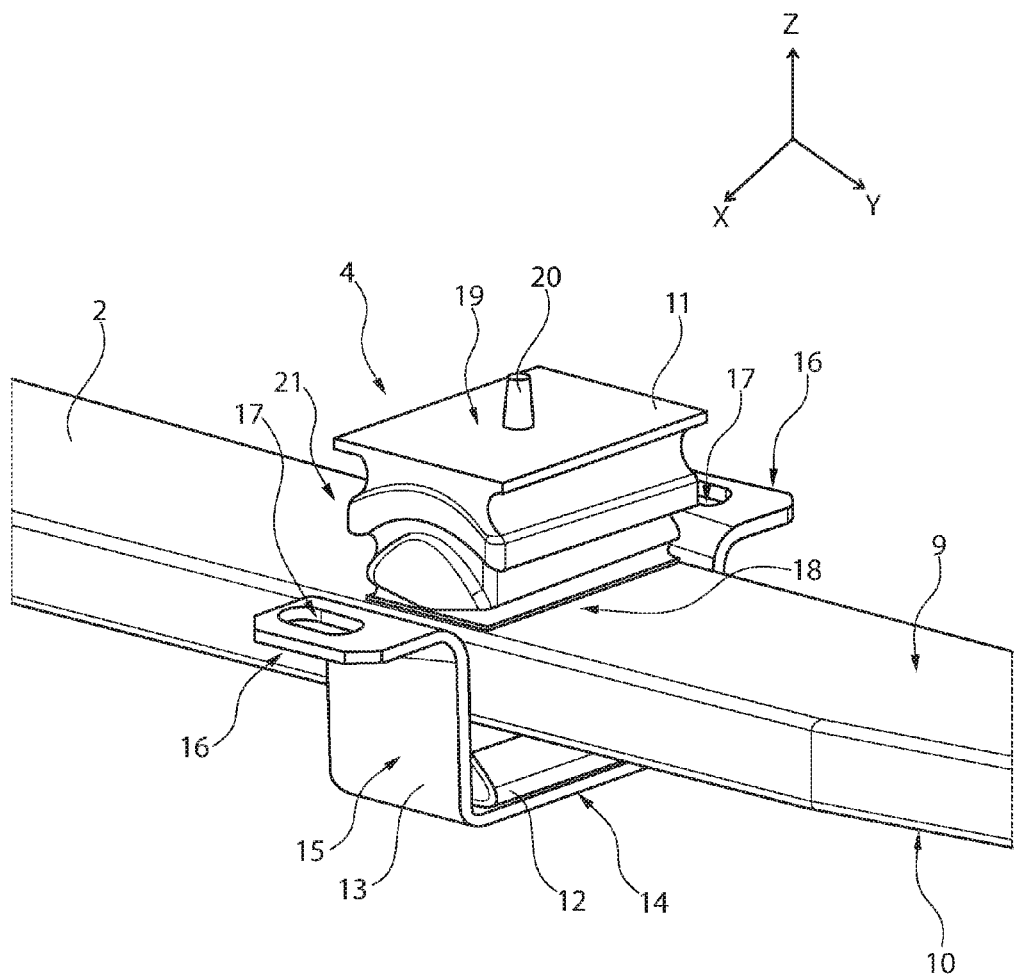
FIG. 2 is a perspective view of a leaf spring bearing in an enlarged partial depiction of the vehicle wheel suspension from FIG. 1.

FIG. 2 is an enlarged view of an exposed part of the vehicle wheel suspension 1 of FIG. 1, showing a segment of the transverse leaf spring 2 and one of the leaf spring bearings 4 according to the present disclosure. The leaf spring bearing 4 comprises two moldings holding between them a segment of the transverse leaf spring 2. These moldings are in contact with opposite sides of the transverse leaf spring 2, in particular in contact with upper side 9 of the transverse leaf spring 2 and the underside 10 of the transverse leaf spring 2. Accordingly, the two moldings can characterized as an upper bearing block 11 and a lower bearing block 12. The upper bearing block 11 has contact with the upper side 9 of the transverse leaf spring 2, while the lower bearing block 12 has contact with the underside 10 of the transverse leaf spring 2.

The two bearing blocks 11, 12 in relation to their arrangement relative to the transverse leaf spring 2, lie immediately opposite each other, while in regions the upper and lower bearing blocks 11, 12 enclose between them the upper side 9 and the underside 10 of the transverse leaf spring. A retention device 13 is shown, which, in certain areas, surrounds the lower bearing block 12 and the transverse leaf spring 2. The retention device 13 allows the transverse leaf spring 2, the lower bearing block 12, and the upper bearing block 11 to be coupled together to the vehicle in the installation position against a bearing region of the vehicle or subframe 7. The retention device 13 may include, for example, a clamp.

The retention device 13 extends substantially in the longitudinal direction x of the leaf spring bearing 4 and hence perpendicular to the longitudinal axis of transverse leaf spring 2. The part of the retention device 13 that extends in the longitudinal direction x is formed by a web 14. The lower bearing block 12 lies between an inner surface portion of the web 14 and a portion of the underside 10 of the transverse leaf spring 2. Legs 15 of retention device 13 are arranged at the ends of the web 14, are angled relative to the web 14, and run parallel to each other in the vertical direction z, towards the transverse leaf spring 2 and extending beyond. Fixing elements are arranged at the respective free ends of the legs 15, in the form of flanges 16 which serve to fix the retention device 13 to the vehicle or the subframe 7. The two flanges 16 extend away from each other in opposite directions and each has a through opening 17. The openings 17 are formed as slots, the greater diameter of which extends parallel to the longitudinal direction of the transverse leaf spring 2. The openings 17 are provided to receive peg-like connecting means not shown here, such as screws.

The upper bearing block 11 includes a lower support face 18, which is configured to have flat contact with at least some portion of the upper side 9 of the transverse leaf spring 2. As shown in the exemplary embodiment of FIG. 2, an upper support surface 19 of the upper bearing block 11 includes a form-fit element 20 in the shape of, for example, a cylinder or truncated cone. The form-fit element 20 is provided to engage in a corresponding opening in a bearing region on the vehicle or subframe 7 (not shown) in order to provide positional security.

As shown in FIG. 2, free side faces 21 of the upper bearing block 11 have a partially curved structure. This is due to elements arranged in the molding of the upper bearing block 11, which will be described in more detail below.

FIG. 3 is a sectional view taken through the upper bearing block 11 of FIG. 2. The section is guided in a plane of the leaf spring bearing 4 spanned by the transverse direction y and the vertical direction z, so that the form-fit element 20 is not contained therein. As is shown, the upper bearing block 11 has elements arranged in its interior. The molding of the upper bearing block 11 is made from an elastic material 22, such as, for example, rubber. A bearing core 23 and an insert 24 are arranged between the two outer support surfaces 18, 19 of upper bearing block 11. The bearing core 23 and the insert 24 are formed from a material harder than the elastic material that forms the body (including the outer surface) of upper bearing block 11.

As shown in the exemplary embodiment of FIG. 3, the upper bearing block 11 further includes two support plates 25, 26, which are harder than the elastic material. One of the two support plates 25, 26 is arranged in each of the regions of the two mutually opposing, outer support surfaces 18, 19 of the upper bearing block 11. As shown, the two support plates 25, 26 are arranged such that one of the plates acts as a lower support plate 25 in the region of the lower support surface 18, and the other plate acts as an upper support plate 26 in the region of the upper support surface 19. Both support plates 25, 26 are surrounded by the elastic material 22 of the molding of the upper bearing block 11.

As shown in FIG. 3, the insert 24 and the bearing core 23 are spaced from each other and from the outer support surfaces 18, 19 of the upper bearing block 11 such that in total, three elastic layers A1, A2, A3 of the elastic material 22 are formed in the body of the upper bearing block 11. Insert 24 has a convex outer surface region 27 facing away from the bearing core 23. Due to the spacing of the insert 24 from the upper support surface 19, enough elastic material 22 is present between these elements that a first elastic layer A1 of the three elastic layers A1, A2, A3 extends between this convex outer surface region 27 of the insert 24 and the upper support surface 19. The upper support surface 19 faces away from the transverse leaf spring 2 in the installation position of the upper bearing block 11.

The bearing core 23 has a convex inner surface region 28 facing the insert 24, which corresponds to a concave inner surface region 29 of the insert 24 that faces the bearing core 23. Due to the mutual spacing of the insert 24 and the bearing core 23, enough elastic material 22 is present between concave inner surface region 29 of insert 24 and convex inner surface region 28 of core 23 such that a second elastic layer A2 of the three elastic layers A1, A2, A3 extends between insert 24 and core 23.

Finally, the bearing core 23 also has a convex outer surface region 30 which faces away from the insert 24. Due to the spacing of the bearing core 23 from the lower support surface 18, there is sufficient elastic material 22 present between the bearing core 23 and the lower support surface 18 to form the third elastic layer A3 of the three elastic layers A1, A2, A3. The lower support surface 18 of the upper bearing block 11 faces the transverse leaf spring 2 in the installation position and is in contact with the transverse leaf spring 2.

FIG. 4 shows the upper bearing block 11 from FIG. 3 again in a perspective view, showing more clearly its structure in the free side surfaces 21. As previously stated, this is attributable to the arrangement of the bearing core 23 and insert 24, and also to the two support plates 25, 26 which are surrounded by the elastic material 22. In this context, the form-fit element 20 already shown in FIG. 2 is also firmly connected to the upper support plate 26 and if necessary can be surrounded at least in regions by the elastic material 22.

FIG. 5 shows an alternative exemplary embodiment of the upper bearing block 11, the difference from the embodiment described above with respect to FIGS. 2-4 is substantially attributable to the configuration of the lower support plate 25. As shown in FIG. 5, the lower support plate 25 includes support elements 32 arranged in its end regions 31. The support elements 32 are designed as legs angled in relation to the lower support plate 25, and extending towards a common side in the vertical direction z away from the upper support plate 26. The support elements are configured to at least partially surround a periphery of the transverse leaf spring 2.

The above descriptions and the configurations of the upper bearing block 11 can be applied in principle to the lower bearing block 12. In other words, both bearing blocks 11, 12 can either be formed identically or have individual features which are described here only for the upper bearing block 11 or the lower bearing block 12.

Figure 6:
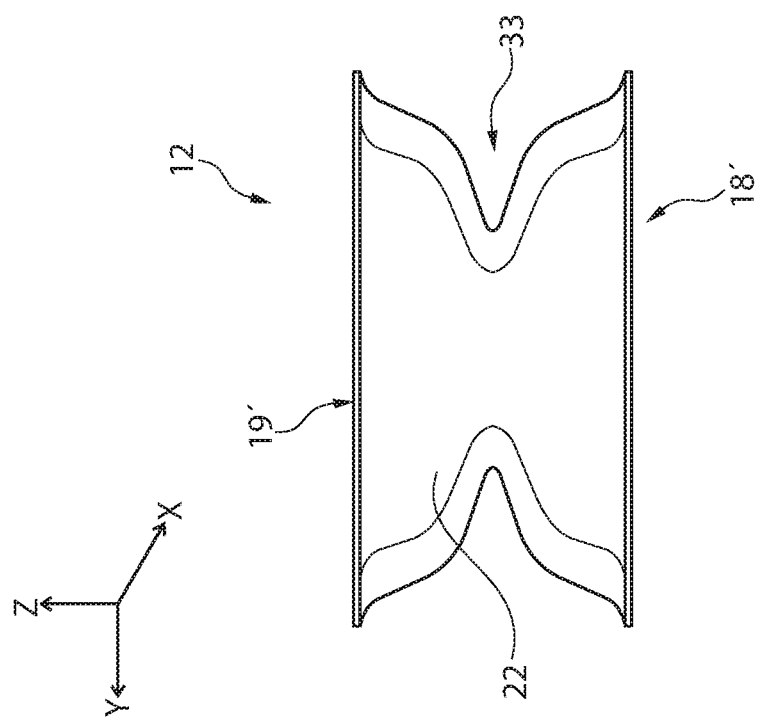
FIG. 6 is front view of an exemplary embodiment of a second bearing block of the leaf spring bearing from FIG. 2.

An exemplary embodiment of the lower bearing block 12 is shown in FIG. 6. As shown, the lower bearing block 12 can be formed from a pure molding of the elastic material 22, that is, the lower bearing block may comprise only elastic material 22. Like the upper bearing block 11, the lower bearing block 12 also has a lower support surface 18' and an upper support surface 19'. In contrast to the upper bearing block 11 however, in the lower bearing block 12, the upper support surface 19' is intended to come into contact in regions with the underside 10 of the transverse leaf spring 2.

The lower bearing block 12 is primarily intended to create sufficient pretension between the retention device 13 and the transverse leaf spring 2. In this way, any relative movements between the transverse leaf spring 2 and the leaf spring bearing 4 can be prevented. In such an embodiment, the lower bearing block 12 is configured such that it generates no additional stiffness in the longitudinal direction x, the transverse direction y, or a rotary direction about the longitudinal direction x.

The lower bearing block 12, in this exemplary embodiment, has a tapering molding of elastic material 22 between its outer support surfaces 18', 19'. This creates a constriction 33 which allows an oblique positioning of the opposing outer support surfaces 18, 19 about the longitudinal direction x of the leaf spring bearing 4.

Figure 7:
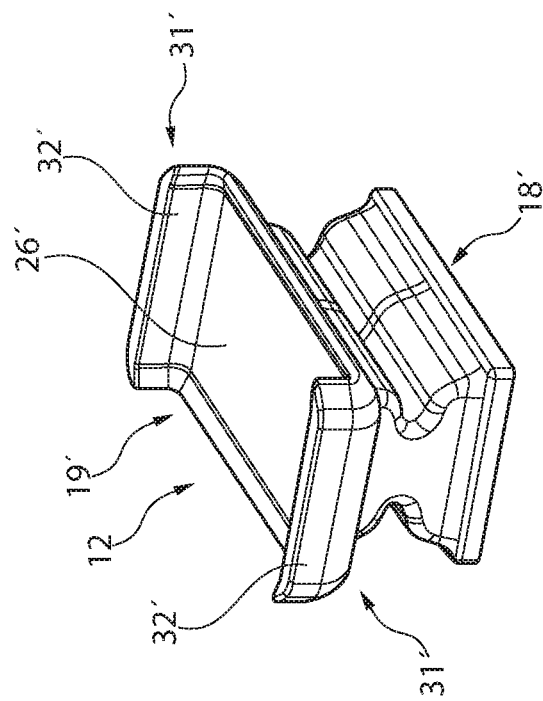
FIG. 7 is a perspective view of an alternative exemplary embodiment of the second bearing block from FIG. 2.

In accordance with another exemplary embodiment of the present disclosure, the lower bearing block 12 can have a bearing core 23 and/or an insert 24 and/or one or two support plates 25, 26 as necessary. As shown in the exemplary embodiment of FIG. 7, the lower bearing block 12, at least in the region of its upper support surface 19', has a support plate 26' with support elements 32' arranged on its end regions 31', as already described above with regard to the lower support plate 25 of the upper bearing block 11. In this exemplary embodiment of lower bearing block 12, the support elements 32' are designed as legs angled in relation to the upper support plate 26', which extend towards a common side in the vertical direction z away from the lower support surface 18'. The support elements 32' also are configured to at least partially surround the periphery of the transverse leaf spring 2.

Insofar as both bearing blocks 11, 12 have corresponding support elements 32, 32', it is noted that these are adapted to the thickness of the transverse leaf spring 2 extending in the vertical direction z. Thus, the respective support elements 32, 32' have a maximum sum of their heights which correspond at most to the thickness of the transverse leaf spring 2 in this region.

Figure 8:
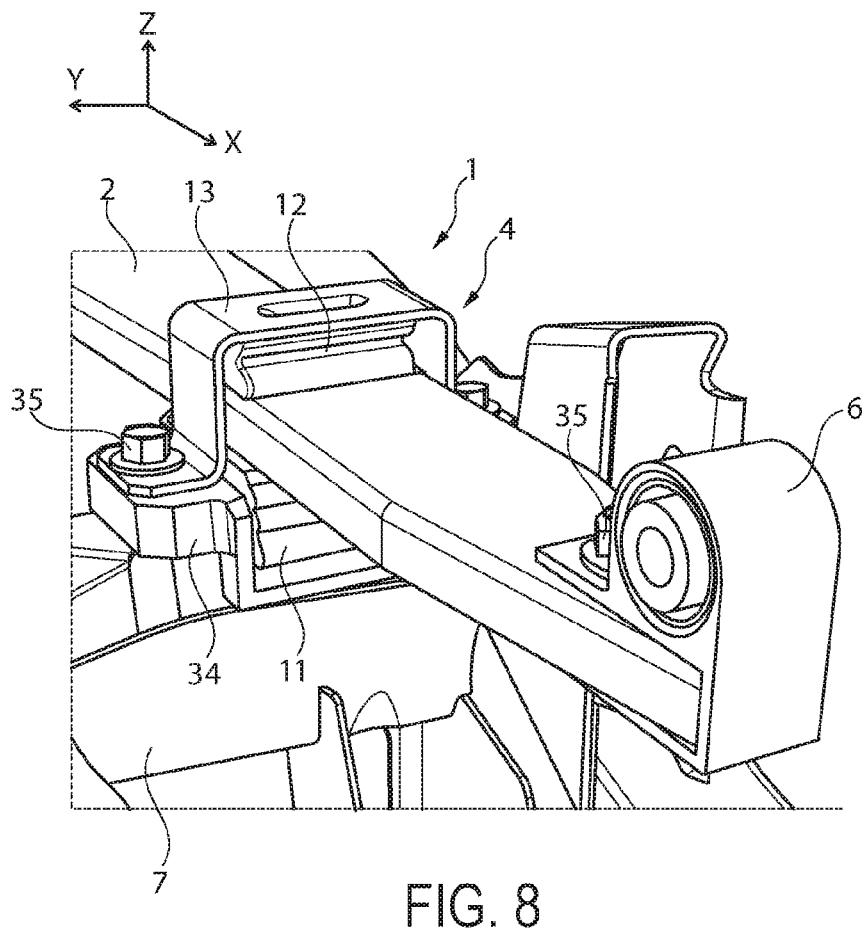
FIG. 8 is an enlarged detailed perspective view of the vehicle wheel suspension from FIG. 1.

FIG. 8 illustrates an enlarged detail of an extract from the vehicle wheel suspension 1 shown in FIG. 1. As shown in FIG. 8, the retention device 13 comprises an additional coupling element 34. The coupling element 34 is connected to the subframe 7 of the vehicle. Coupling element 34 has a design substantially similar to that of the bracket of the retention device 13. As shown, the bracket of the retention device 13 together with the coupling element 34 is fixed to the subframe 7 via releasable connecting means 35, such as, for example, screws. The bracket of the retention device 13 and the coupling element 34 enclose between them the two bearing blocks 11, 12 and also the transverse leaf spring 2 position between the upper and lower bearing blocks 11, 12. The articulated connection 6 is shown at the end of the transverse leaf spring 2, surrounding the end portion 5 of the transverse leaf spring 2, at least in regions, and connected thereto via a further connecting means 35.

Figure 9:
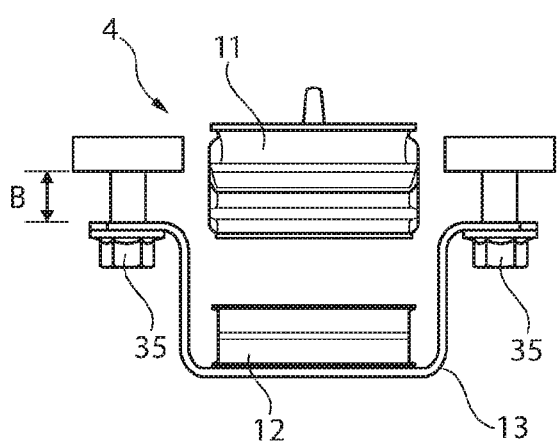
FIG. 9 is a view of the leaf spring bearing of FIG. 2 in the longitudinal direction of the transverse leaf spring.

FIG. 9 illustrates creation and adjustment of a desired pretension within the leaf spring bearing 4. With the transverse leaf spring 2 absent, FIG. 9 shows the leaf spring bearing 4 in the longitudinal direction of the transverse leaf spring 2. The two bearing blocks 11, 12 are spaced apart in order to hold between them the transverse leaf spring 2, not shown here. Flange 16 of the retention device 13 is connected to the coupling element 34 by the connecting means 35 but is spaced from coupling element 34 by distance B. By rotation of the connecting means 35 about its longitudinal axis, the distance B may be manipulated, i.e., it may be enlarged or reduced. By reducing distance B, more pretension can be built up within the leaf spring bearing 4 in that the bearing blocks 11, 12 are compressed more strongly. Increasing distance B decreases the amount of pretension in leaf spring bearing 4.

Figure 10:
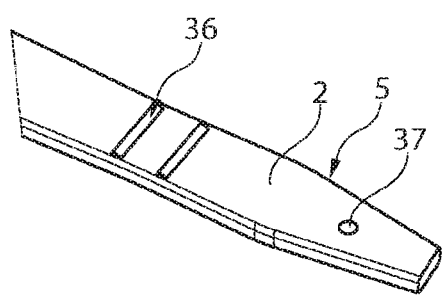
FIG. 10 is an enlarged perspective view of a detail of a free end portion of the transverse leaf spring from FIG. 1.

As shown in FIG. 10 and in accordance with the present teachings, at least one form-fit element 36 may be arranged on an end portion 5 of the leaf spring 2. As embodied herein, an opening 37 through the end portion 5 of leaf spring 2 may be provided, in or through which the connecting means 35 (shown in FIG. 8) for the articulated connection 6 can be arranged. The form-fit element 36 is arranged in a contact region between the transverse leaf spring 2 and one of the contact surfaces 18, 18', 19, 19' of at least one of the two bearing blocks 11, 12 with which the transverse leaf spring 2 is in contact in the installation position. Additionally or alternatively, all surface regions in contact with each other can have corresponding form-fit elements 36. Such form-fit elements are configured to prevent possible slip in the contact regions.

Figure 11:
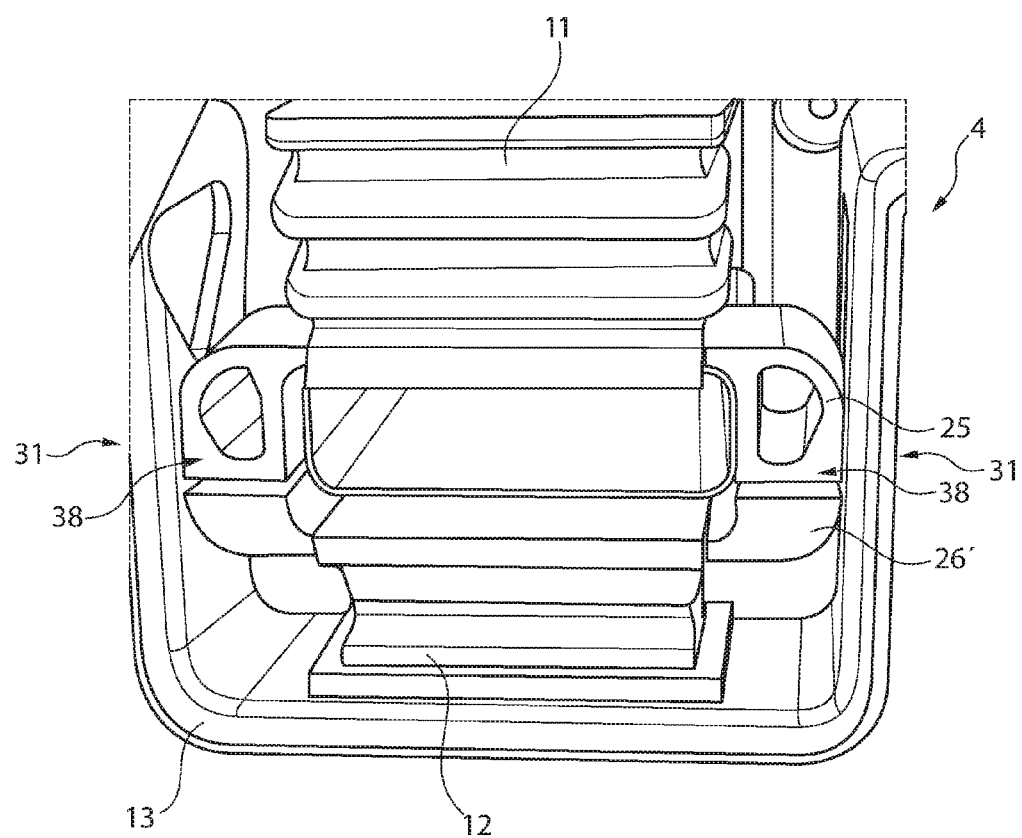
FIG. 11 is a perspective view of an alternative embodiment of the leaf spring bearing from FIG. 9.
Figure 12:
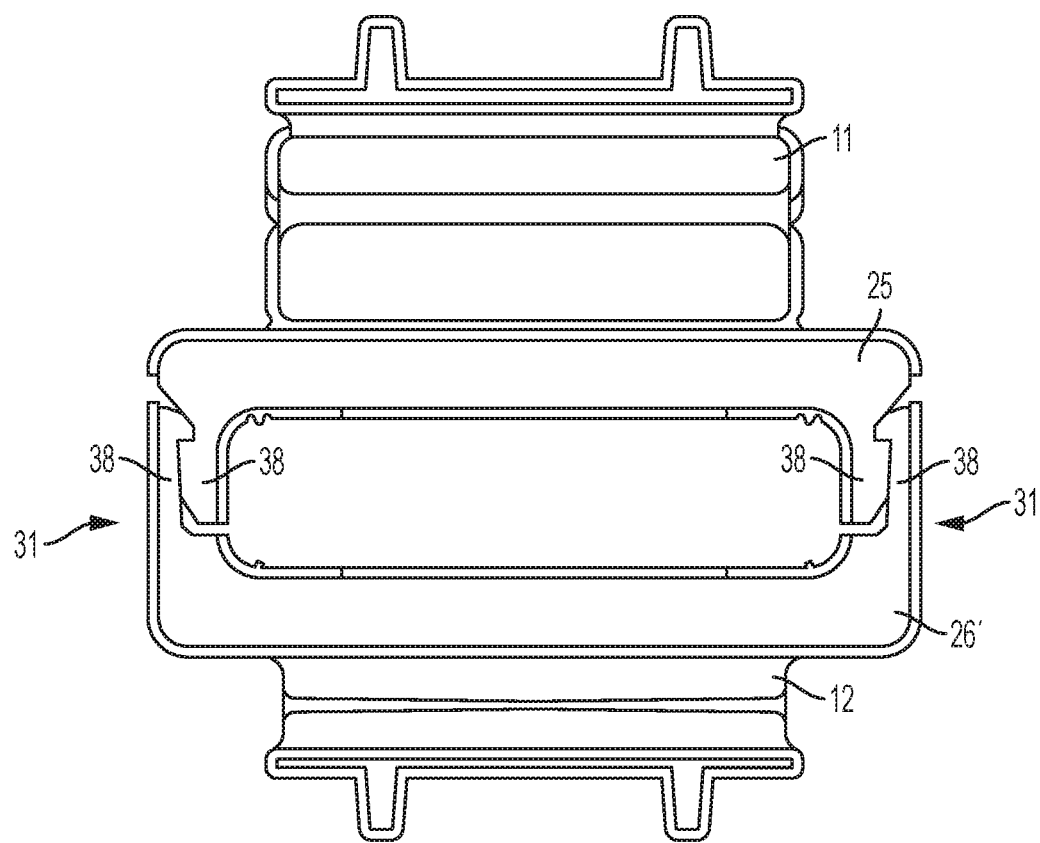
FIG. 12 shows a schematic drawing of yet another alternative embodiment of the leaf spring bearing from FIG. 9.

In accordance with the present teachings, FIGS. 11 and 12 illustrate two alternative exemplary embodiments of a leaf spring bearing, respectively. A view of the region between the two bearing blocks 11, 12, in which the leaf spring 2 (not shown) is to be arranged, in both FIGS. 11 and 12, shows that the lower support plate 25 of the upper bearing block 11 is coupled to the upper support plate 26' of the lower support block 12. For such a coupling, the two support plates 25, 26' are provided with closing contours 38 arranged at their respective end regions 31. The closing contours 38 are at least partially in engagement with each other. In this way the two bearing blocks 11, 12 can first be fixed to the transverse leaf spring 2, in that these bearing blocks 11, 12 surround a portion of the transverse leaf spring 2, and then, via their closing contours 38, the two bearing blocks 11, 12 come into engagement with each other. Via a corresponding pretension, the bearing blocks 11, 12 are then fixed firmly on the leaf spring 2, whereby a very easy mounting of the assembled transverse leaf spring 2 is possible.

The closing contours 38 shown in FIGS. 11 and 12 are formed on the upper support plate 26' of the lower bearing block 12 as hook elements which engage with respective undercuts behind corresponding protrusions in the lower support plate 25 of the upper bearing block 11.

The vehicle wheel suspension according to the present disclosure described above and the leaf spring bearing are not restricted to the embodiments disclosed herein but evidently also comprise further embodiments with similar function.

Further modifications and alternative embodiments will be apparent to those of ordinary skill in the art in view of the disclosure herein. For example, the systems may include additional components that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and embodiments disclosed herein. It is intended that the specification and embodiments described herein be considered as exemplary only.

What is claimed is:

1. A leaf spring bearing for a vehicle with a transverse leaf spring, comprising:
    an upper bearing block and a lower bearing block between which a portion of the transverse leaf spring can be interposed, each bearing block being formed at least partially of elastic material and comprising an upper support surface and a lower support surface,
    wherein a thickness of a layer of the elastic material disposed between a bearing core and an insert increases from a middle portion of the layer toward outer end portions of the layer in the upper bearing block or the lower bearing block.

2. The leaf spring bearing as claimed in claim 1, wherein each of the upper and lower bearing blocks include two support plates.

3. The leaf spring bearing as claimed in claim 2, wherein at least one of the support plates includes end portions configured to at least partially surround a periphery of the transverse leaf spring.

4. The leaf spring bearing as claimed in claim 1, wherein the bearing core and the insert are positioned in the elastic material between the upper and lower support surfaces so as to define three layers of the elastic material within the at least one bearing block.

5. The leaf spring bearing as claimed in claim 4, wherein the bearing core and the insert are harder than the elastic material.

6. The leaf spring bearing as claimed in claim 5, wherein at least one of the upper bearing block and the lower bear block includes at least one support plate, wherein the at least one support plate is harder than the elastic material.

7. The leaf spring bearing as claimed in claim 4, wherein each of the upper and lower bearing blocks include a bearing core and an insert.

8. The leaf spring as claimed in claim 4, wherein the upper bearing block includes the bearing core and the insert.

9. The leaf spring as claimed in claim 8, wherein the lower bearing block includes two support plates.

10. The leaf spring bearing as claimed in claim 4, wherein the insert has a convex outer surface region facing away from the bearing core, and wherein a first of the three elastic layers extends between the convex outer surface region of the insert and one of the support surfaces of the block which faces away from the transverse leaf spring in an installation position.

11. The leaf spring bearing as claimed in claim 10, wherein the bearing core has a convex inner surface region facing the insert which corresponds to a concave inner surface region of the insert facing the bearing core, wherein a second of the three elastic layers extends between the convex inner surface region of the bearing core and the opposing concave inner surface region of the insert.

12. The leaf spring bearing as claimed in claim 11, wherein the bearing core has a convex outer surface region facing away from the insert, wherein a third of the three elastic layers extends between the convex outer surface region of the bearing core and one of the support surfaces which faces the transverse leaf spring in the installation position.

13. The leaf spring bearing as claimed in claim 1, wherein the upper bearing block or the lower bearing block includes:
    the bearing insert disposed between the upper support surface and the lower support surface of the bearing block; and
    the bearing core disposed between the bearing insert and the transverse leaf spring in an installation position, wherein the upper bearing core has a convex upper surface and a convex lower surface.

14. A vehicle wheel suspension comprising:
    a transverse leaf spring; and
    a leaf spring bearing comprising two bearing blocks of elastic material between which the transverse leaf spring is positioned, the leaf spring bearing coupling the transverse leaf spring to a vehicle,
    wherein at least one of the bearing blocks has a bearing core and an insert positioned in the elastic material between an upper support surface and a lower support surface of the block so as to define three layers of the elastic material within the at least one bearing block, and
    wherein at least one form-fit element is provided which is arranged in a contact region between the transverse leaf spring and a support surface of at least one of the two bearing blocks with which the transverse leaf spring is at least partially in contact.

15. The vehicle wheel suspension as claimed in claim 14, further comprising a retention device at least partially surrounding at least one of the bearing blocks and the transverse leaf spring such that the transverse leaf spring and the bearing blocks are together coupled to the vehicle via the retention device.

16. A leaf spring bearing for a vehicle with a transverse leaf spring, comprising:
an upper bearing block and a lower bearing block between which a portion of the transverse leaf spring can be interposed, each bearing block being formed at least partially of an elastic material and comprising an upper support surface and a lower support surface,
wherein the bearing has a stiffness in a vertical direction, a torsional stiffness, and a transverse stiffness, wherein the stiffness in the vertical direction is greater than the torsional stiffness and greater than the transverse stiffness, and
wherein at least one of the upper and lower bearing blocks comprises three layers of the elastic material, wherein the layers of the elastic material are at least partially separated from one another by a material having a hardness greater than the hardness of the elastic material.

17. The leaf spring bearing as claimed in claim 16, wherein the upper support surface of the upper bearing block comprises a form-fit element configured to engage the vehicle or a subframe.

18. The leaf spring bearing as claimed in claim 16, wherein the lower bearing block consists of elastic material.

19. The leaf spring bearing as claimed in claim 16, wherein the lower bearing block comprises a constriction.

20. The leaf spring bearing as claimed in claim 19, wherein the constriction is configured to allow oblique positioning of the support surfaces of the lower bearing block about a longitudinal direction of the leaf spring bearing.

21. A leaf spring bearing for a vehicle with a transverse leaf spring, comprising:
an upper bearing block and a lower bearing block between which a portion of the transverse leaf spring can be interposed, each bearing block being formed at least partially of an elastic material and comprising an upper support surface and a lower support surface,
wherein a thickness of a layer of the elastic material increases from a middle portion of the layer toward outer end portions of the layer in the upper bearing block or the lower bearing block,
wherein each of the upper and lower bearing blocks has a support plate arranged either outside the elastic material or at least partially surrounded by the elastic material in an area of the upper or lower support surface of the respective bearing block, and
wherein the support plates have closing contours arranged at their respective end regions which are configured to at least partially engage each other to couple the two bearing blocks.

* * * * *